United States Patent [19]

Himes et al.

[11] Patent Number: 5,191,931
[45] Date of Patent: Mar. 9, 1993

[54] FLUID LOSS CONTROL METHOD

[75] Inventors: Ronald E. Himes; Walter R. Dill, both of Duncan, Okla.

[73] Assignee: Halliburton Company, Duncan, Okla.

[21] Appl. No.: 765,076

[22] Filed: Sep. 24, 1991

[51] Int. Cl.$^5$ .................... E21B 43/27; E21B 43/28
[52] U.S. Cl. .................................... 166/282; 166/284
[58] Field of Search ............................. 166/282, 284

[56] References Cited

U.S. PATENT DOCUMENTS

| 3,319,716 | 5/1967 | Dill | 166/42 |
| 3,336,980 | 8/1967 | Rike | 166/280 X |
| 3,601,194 | 8/1971 | Gallus | 166/282 X |
| 3,750,768 | 8/1973 | Suman, Jr. et al. | 166/295 X |
| 4,716,964 | 1/1988 | Erbstoesser et al. | 166/284 |

OTHER PUBLICATIONS

Mahajan, N. C. and Barron, B. M.: "Bridging Particle Size Distribution, A Key Factor in the Designing of Non-Damaging Completion Fluids", Paper SPE 8792, Presented at the 4th Symposium on Formation Damage Control, Jan. 28-29, 1980, Bakersfield, Calif.
Abrams, A.: "Mud Design to Minimize Rock Impairment Due to Particle Invasion", *JPT*, (May 1977), pp. 586-592.
Sparlin, D. D. and Hagen, R. W.: "Soluble Fluid Loss Additives Can Reduce Well Productivities and Prevent Complete Gravel Placement", Paper SPE 14817, Presented at the 7th Symposium on Formation Damage Control, Feb. 26-27, 1986, Lafayette, La.
Mondshine, T. C.: "Completion Fluid Uses Salt for Bridging, Weighting", *The Oil and Gas Journal*, (Aug. 22, 1977), pp. 124-128.

Primary Examiner—William P. Neuder
Attorney, Agent, or Firm—Thomas R. Weaver; David J. Alexander

[57] ABSTRACT

A method of temporarily reducing fluid loss into a subterranean formation from a well bore penetrating the formation by way of at least one perforation is provided. A first soluble particulate solid material is introduced into the formation by way of the perforation having a particle size whereby it bridges on the face of the formation and fills the perforation but allows fluid flow therethrough. A second soluble particulate solid material is introduced into the well bore having a particle size such that it bridges on the first particulate solid material and forms a seal over the perforation within the well bore.

20 Claims, 6 Drawing Sheets

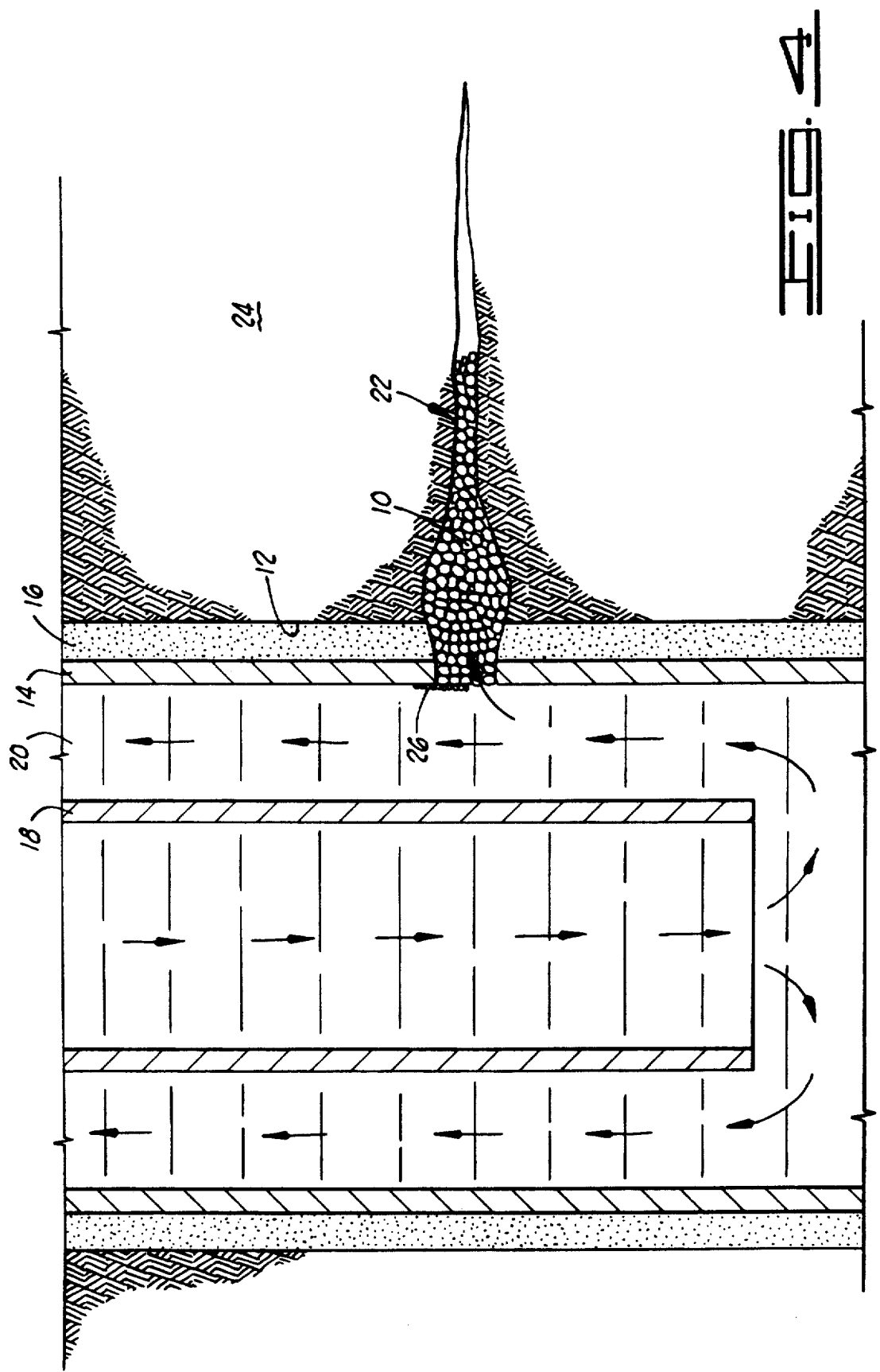

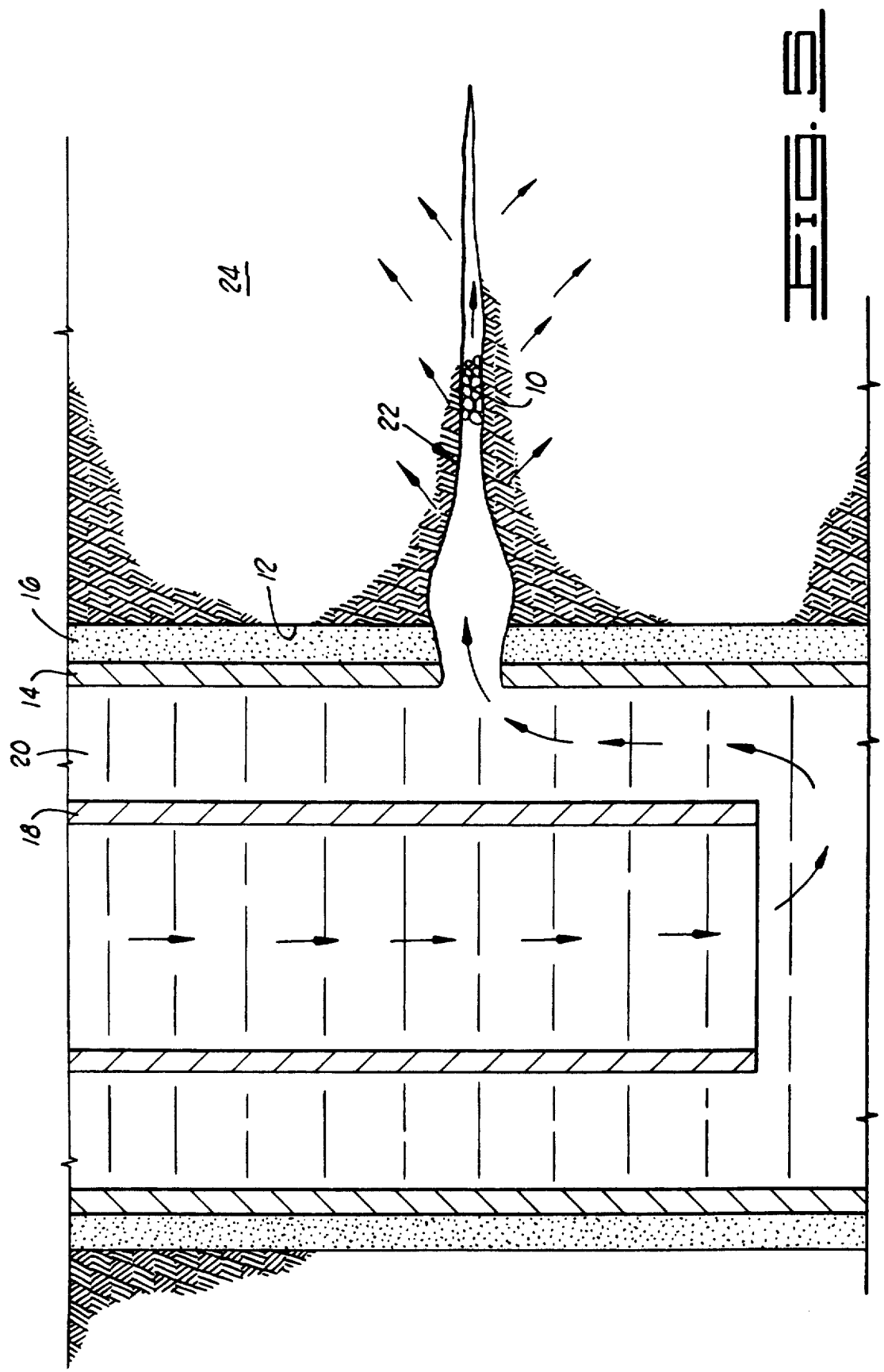

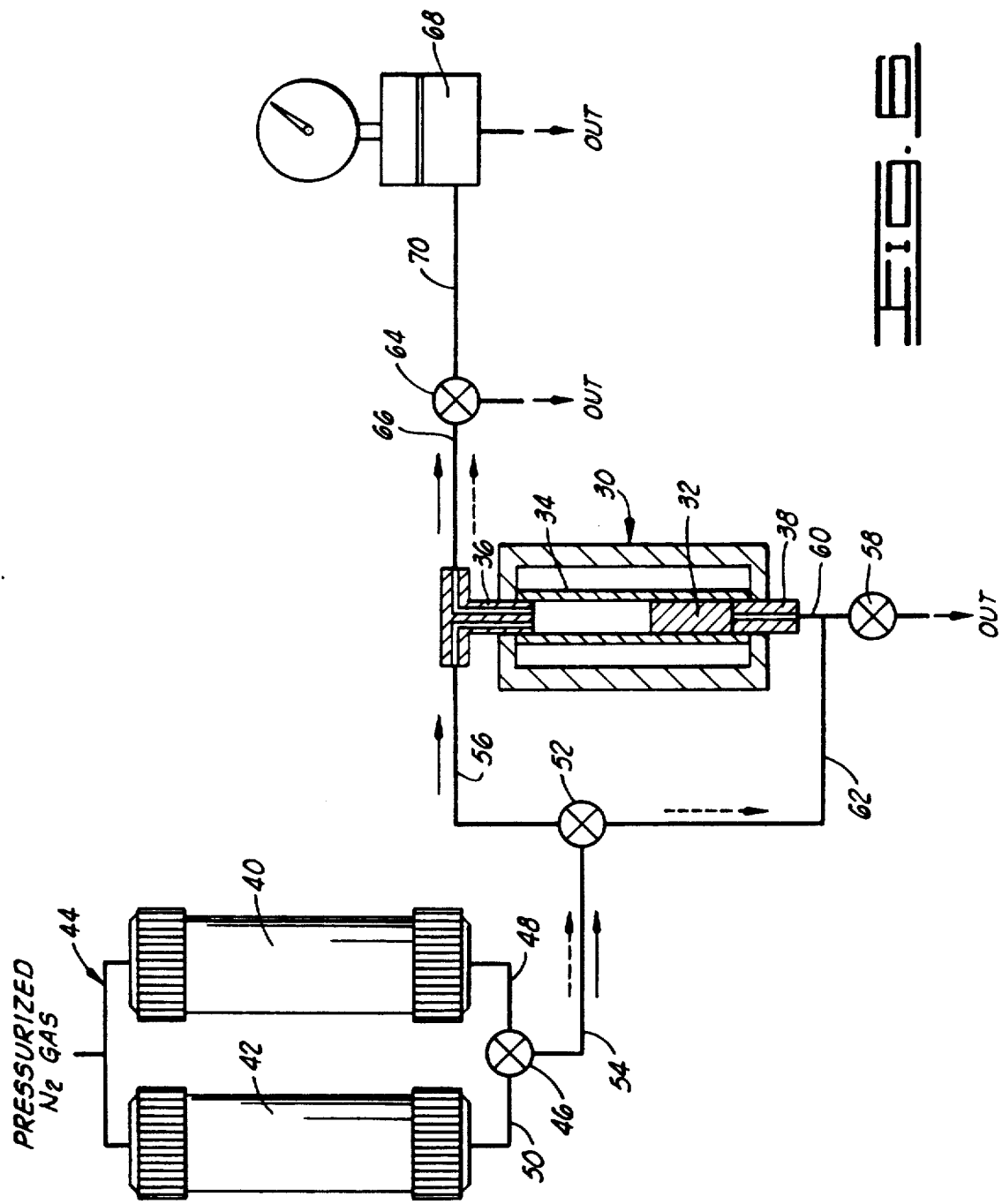

FLUID LOSS CONTROL METHOD

BACKGROUND OF THE INVENTION

1. Field of the Invention

The present invention relates generally to fluid loss control methods, and more particularly, to methods of temporarily stopping fluid losses from well bores into subterranean formations by way of perforations extending therebetween.

2. Description of the Prior Art

In the completion of oil and gas wells, high density fluids must often be used to prevent blowouts during the performance of procedures such as perforating, gravel packing and the like. High density completion fluids are weighted with density increasing materials such as calcium chloride, calcium bromide, zinc bromide, barium sulfate and the like whereby the hydrostatic head of the completion fluid within a well bore and exerted on subterranean formations penetrated thereby is greater than the fluid pressures within the formations. This positive pressure towards the subterranean formations causes the completion fluid to be lost into the formations unless one or more fluid loss control agents are included in the completion fluid.

The loss of high density completion fluids is very undesirable in that the completion fluids are very expensive, and if high losses are experienced thousands of dollars in cost can be lost. Another problem is that high density completion fluids must be relatively viscous in order to suspend weighting materials included therein. When the viscous fluids are lost into formations containing hydrocarbons, the permeabilities of the formations can be reduced which in turn reduces the ability to produce hydrocarbons from the formations. In addition, some formations containing hydrocarbons also contain clays which swell when contacted by the highly saline completion fluids. The clays then migrate with fluids produced from the formation causing further formation permeability damage, etc. Thus, it is mandatory that the loss of high density completion fluids to subterranean formations be prevented.

A variety of additives have heretofore been included in completion fluids to reduce fluid loss. Most of such additives fall into the categories of particulates or gels. Particulate fluid loss materials function as fluid loss control agents by bridging on the faces of permeable formations. They are sized to form low permeability barriers which restrict completion fluid flow into the formations. The heretofore used particulates have been of both the soluble and insoluble types. Soluble particulates are removed by washing or flushing the well bore with one or more solvents which dissolve the soluble particulates, or the soluble particulates are dissolved in hydrocarbon fluids subsequently produced from one or more formations penetrated by the well bore. Examples of particulate fluid loss additives which are soluble in subsequently produced hydrocarbons are disclosed in U.S. Pat. No. 3,319,716 issued on May 16, 1967. Insoluble particulates such as sized sand have also been utilized which are subsequently removed by hydrocarbon production.

Gel fluid loss additives, known as gel "pills" are made from various natural polymers such as guar gum, cellulose and their derivatives. The polymers are added to the completion fluid in relatively high concentrations, or lower concentrations are utilized and the polymers are crosslinked. A particularly successful fluid loss reducing gel is hydroxyethylcellulose. Simple non-crosslinked hydroxyethyl-cellulose gels do not bridge on the formation, but rather enter the formation adjacent the well bore whereby a high viscosity gel barrier reduces fluid loss. The gel is subsequently broken by internal or external gel breaking chemicals so that hydrocarbon fluids can be produced from the formation. However, non-crosslinked hydroxyethylcellulose gel only slows the rate of fluid loss, and generally, the fluid loss can not be completely stopped without including a particulate material which bridges on the face of the formation.

In the use of high density completion fluids, soluble particulates that bridge on the formation face and essentially completely stop fluid loss have heretofore been included in the completion fluids. However, when such completion fluids are used in well bores which include casing or liners cemented therein and the completion fluids must flow through perforations formed through the cemented casing or liners in order to bridge on the face of the formation, impenetrable plugs can be formed in the perforations which can not subsequently be removed. For example, when the soluble solid particulates bridge on a formation face and fill the perforations extending from within the well bore into the formation, solvents for the soluble particulates subsequently circulated through the well bore have limited contact with the particulates. The solvents can not penetrate the perforations and do not remove the particulates from the perforations. In a number of completion procedures such as gravel packing completions, it is not possible to flow the producing formation to remove the particulates prior to placing the gravel pack, and the particulates can be locked in place by the gravel pack sand. This can stop or drastically reduce hydrocarbon production from the formation requiring the performance of costly reperforation and other remedial procedures.

Thus, there is a need for an improved method of preventing high density completion fluid loss using soluble particulate materials whereby the soluble particulate materials can be readily removed from perforations extending from the well bore into the formation.

SUMMARY OF THE INVENTION

By the present invention improved methods of substantially stopping fluid loss into subterranean formations by way of perforations which meet the need described above and overcome the shortcomings of the prior art are provided. In accordance with the methods, a first particulate solid material which is soluble in a selected solvent is introduced into a well bore and into a subterranean formation penetrated thereby by way of perforations extending from within the well bore into the formation. The first particulate solid material has a particle size such that it bridges on the face of the formation and fills the perforation, but allows some fluid flow therethrough. A second particulate solid material which is soluble in a selected solvent is then introduced into the well bore. The second particulate solid material has a smaller particle size than the first particulate solid material whereby it bridges on the first particulate solid material and forms a fluid flow barrier over the perforations within the well bore.

Subsequently, when it is desired to remove the particulate solid materials from the well bore, the perforations and the formation, at least one solvent for the particulate solid materials is flowed through the well bore. The solvent contacts the second particulate solid material within the well bore whereby it is dissolved and the barriers over the perforations within the well bore are removed. The solvent then flows into the perforations, through the first particulate solid material disposed therein and bridged on the formation into the formation. The solvent flow dissolves the first particulate solid material and removes it from the perforations.

It is, therefore, a general object of the present invention to provide improved fluid loss control methods utilizing soluble particulate solid materials.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 4 is a cross-sectional view similar to FIG. 1, but showing the well bore and perforation after a solvent for the second particulate solid material has been circulated through the well bore.

FIG. 5 is a cross-sectional view similar to FIG. 1, but showing the well bore and perforation after a solvent for the first particulate solid material has been circulated through the well bore and through the perforation.

FIG. 6 is a schematic illustration of apparatus for testing the methods of this invention.

DESCRIPTION OF PREFERRED EMBODIMENTS

The present invention provides improved methods for temporarily stopping fluid loss into a subterranean formation from a well bore penetrating the formation by way of perforations extending therebetween. The methods are particularly suitable for use in oil and gas well operations wherein high density fluids are utilized to prevent blowouts. For example, in perforating a well bore having casing or a liner cemented therein into a high pressure oil and/or gas zone, the well bore is filled with a high density completion fluid having sufficient hydrostatic head to prevent a blowout as a result of fluids from the high pressure zone entering and flowing upwardly through the well bore. When the perforations are formed, the high density completion fluid flows through the perforations against the face of the formation, but is prevented from entering the formation by sized particulate solid materials placed in the well bore as will be described hereinbelow.

The methods of this invention are particularly suitable for use in wells in which gravel pack completions are required. That is, in certain producing formations loose or incompetent sands contained in the formations migrate into the well bore with hydrocarbon fluids produced therefrom. Unless prevented, the migration of the loose materials can cause the well bore to be plugged and/or severe damage to tubular goods and surface equipment to take place. A gravel pack completion in such a well involves perforating the well bore followed by the placement of a consolidated gravel pack within the well bore which prevents the migration of loose or incompetent sands from the formation into the well bore, but allows the flow of hydrocarbon fluids therethrough. Because the well can not be produced until the gravel pack has been placed, soluble particulate solid materials could not be used to prevent fluid loss prior to the present invention. That is, while soluble particulate solid material contained within the well bore can be dissolved in an appropriate solvent circulated through the well bore, soluble particulate solid material bridged on the face of the formation and contained within the perforations can not be contacted by the solvent and can not be removed.

By the present invention, improved methods of utilizing soluble particulate solid material for substantially stopping the loss of high density completion fluids in perforated well bores are provided wherein the particulate solid material is readily removed from the perforations by dissolution in one or more solvents circulated through the well bore.

Figure 1:
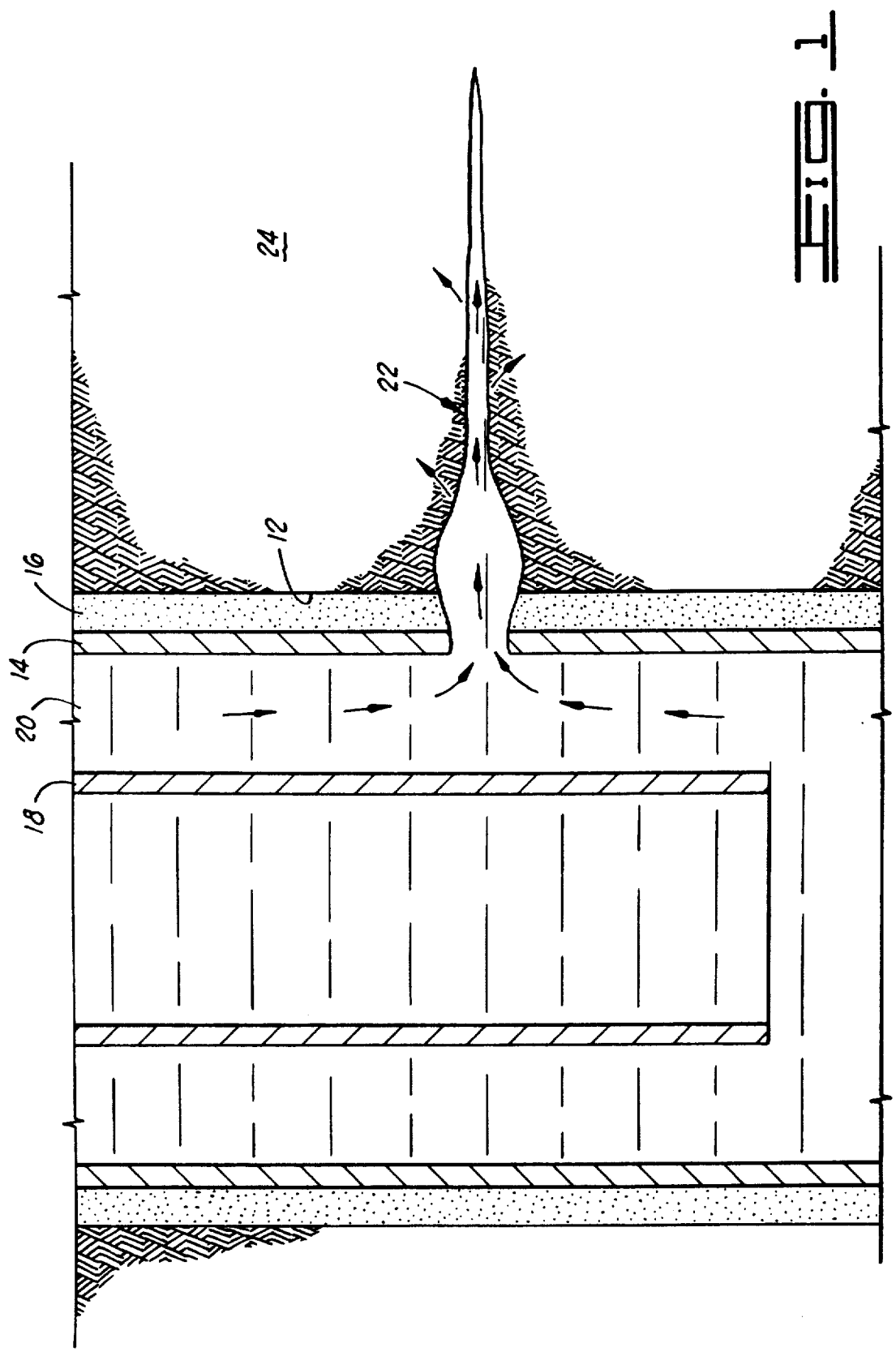
FIG. 1 is a side cross-sectional view of a portion of a well bore penetrating a subterranean formation and a perforation extending therebetween immediately after the perforation is formed.

Referring to the drawings, and particularly to FIG. 1, a portion of a well bore 12 penetrating a subterranean formation 24 is illustrated immediately after a perforation 22 is formed communicating the well bore 12 with the formation 24. As indicated by the arrows in FIG. 1, high density completion fluid 20 contained within the well bore 12 flows through the perforation 22 into the formation 24.

In the usual case, the well bore 12 has a metal conduit 14 referred to in the art as a casing or liner disposed therein. A cement sheath 16 in the annulus between the casing or liner 14 and the walls of the well bore 12 bonds the casing or liner 14 to the walls and prevents fluids from flowing through the annulus. A string of tubing 18 is suspended within the casing or liner 14 and the annulus between the tubing 18 and the casing or liner 14 as well as a portion of the tubing 18 is filled with the high density completion fluid 20. The perforation 22 extends through the casing or liner 14, through the cement sheath 16 and into the formation 24.

Figure 2:
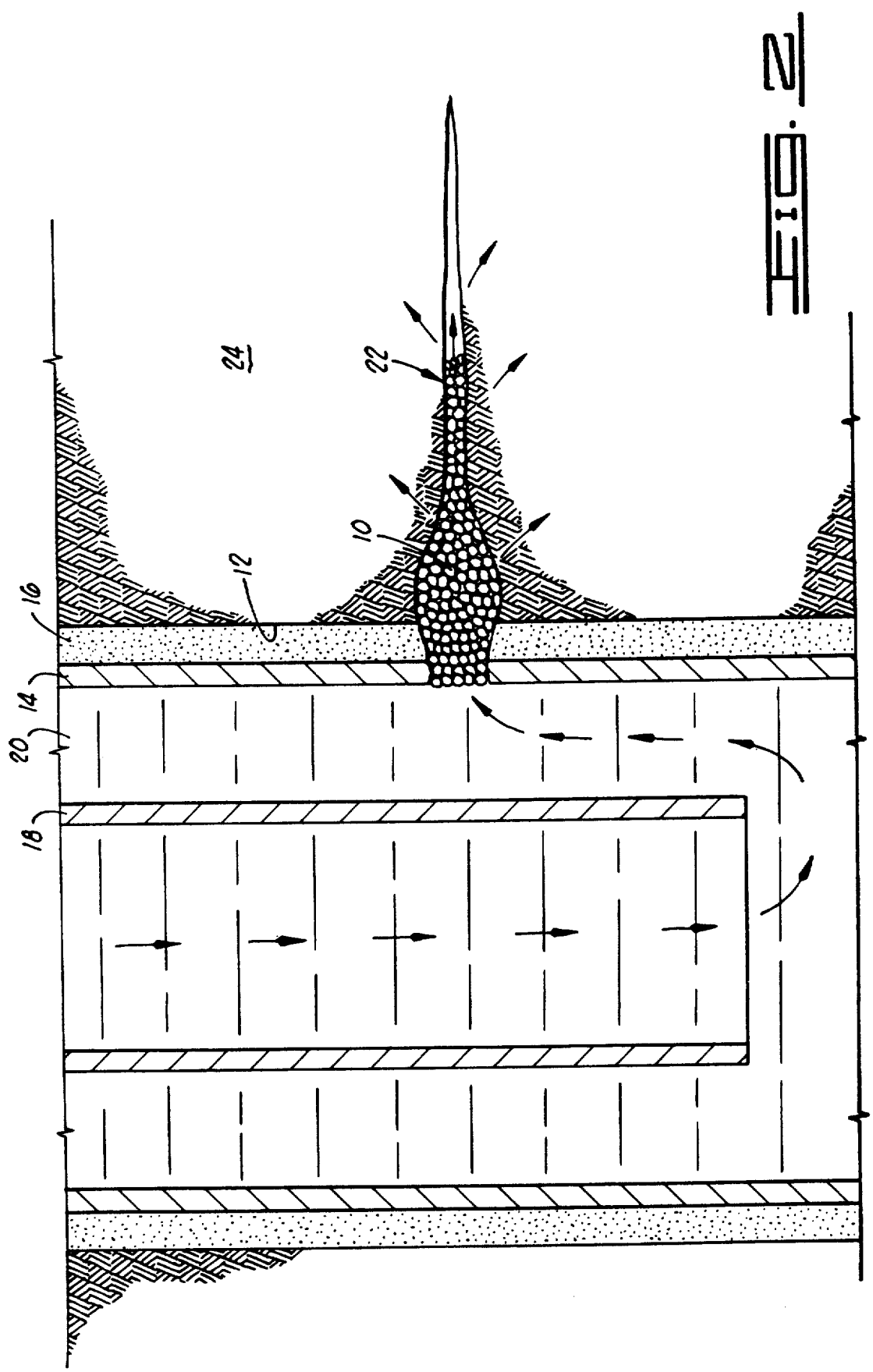
FIG. 2 is a cross-sectional view similar to FIG. 1, but showing the well bore and perforation after the introduction of a first particulate solid material thereinto.

A first particulate solid material 10 is introduced into the well bore 12 by means of a carrier liquid in which it is insoluble and suspended. The slurry of particulate solid material 10 is pumped down the tubing 18 after the perforation 22 is formed. As a result of the flow of fluid into the formation 24 by way of the perforation 22, the carrier liquid slurry of the first particulate solid material 10 flows through the perforation 22 whereby the particulate solid material 10 bridges on the face of the formation 24 and fills the cavity or tunnel of the perforation 22 as illustrated in FIG. 2.

The first particulate solid material 10 is of a particle size such that it bridges on the face of the formation 24 and fills the perforation 10, but allows some fluid flow therethrough. That is, even though the perforation 22 is filled with the first particulate solid material 10 as illustrated in FIG. 1, liquid from the interior of the casing or liner 14 continues to flow through the porosity of the first particulate solid material 10 and into the formation 24.

Figure 3:
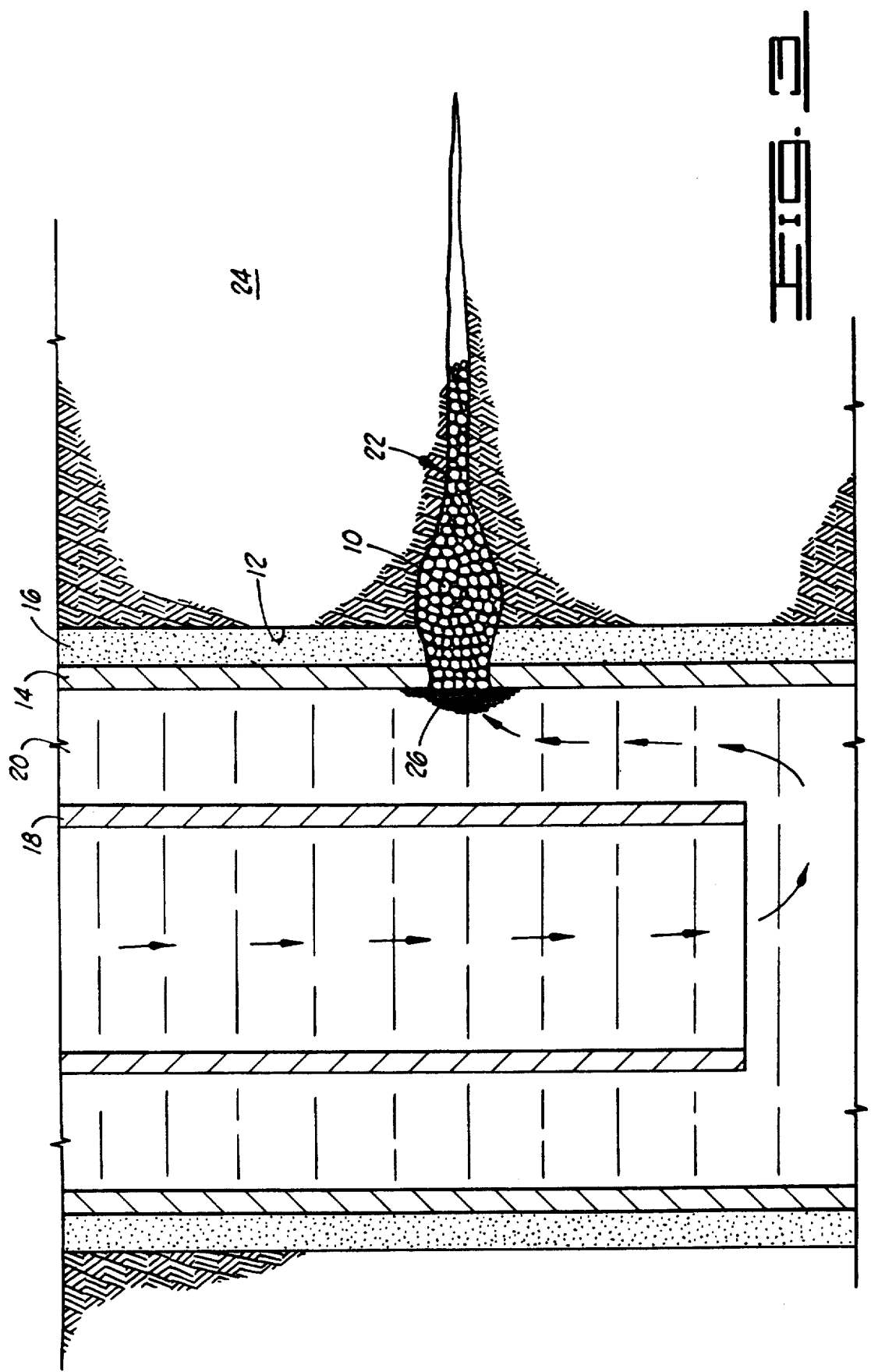
FIG. 3 is a side cross-sectional view similar to FIG. 1, but showing the well bore and perforation after the introduction of a second smaller particulate solid material thereinto.

After the placement of the first particulate solid material, a second particulate solid material 26 which is also soluble in a selected solvent is introduced into the well bore 12 by way of the tubing 18. That is, the second particulate solid material 26 which is smaller than the first particulate solid material 10 is slurried in a carrier liquid in which it is insoluble and pumped down the tubing 18 to the location of the perforation 22. As a result of the continued fluid loss through the first particulate solid material 10 within the perforation 22 and into the formation 24, the second particulate solid material 26 bridges on the first particulate solid material 10 and forms a seal over the opening of the perforation 22 within the interior of the casing or liner 14 as illustrated in FIG. 3. The smaller second particulate solid material 26 is of a size such that it bridges on the first solid material and forms a fluid flow barrier over the perforation 22 whereby fluid loss from the well bore 12 to the formation 24 is substantially completely stopped.

As will be understood by those skilled in the art, the well bore 12 normally contains a plurality of perforations 22, all of which are filled with the first particulate solid material 10 and sealed with the second solid particulate material 26 at substantially the same time. Once the perforations are sealed, the next operation to be performed within the well bore 12 such as the removal of the perforating equipment and introduction of the gravel pack screen assembly is carried out.

Subsequently, just prior to forming the gravel pack when it is desired to open the perforations, i.e., to remove the first and second particulate solid materials from the well bore 12, the perforations 22 and the formation 24, a solvent for the particulate solid material 2 is circulated down the tubing 18 and upwardly in the annulus between the tubing 18 and the casing or liner 14 as shown in FIG. 4. While the first and second particulate solid materials can be different and two different solvents can be employed, it is preferred that the first and second particulate solid materials are the same whereby a single solvent can be used. In that case, the solvent first dissolves the smaller second particulate solid material 26 within the casing or liner 14 as illustrated in FIG. 4. When the second particulate solid material 26 is dissolved to the point where it no longer seals the perforation 22, the solvent flows into the perforation 22 by way of the porosity of the first particulate solid material 10. As illustrated in FIG. 5, the solvent continues to flow through the perforation 22 and into the formation 24 whereby the first particulate solid material 10 is also dissolved and all of the particulate solid material is removed.

As mentioned above, the first particulate solid material is of a size such that it bridges on the face of the formation and fills the perforations while continuing to allow some fluid flow therethrough. In order to bridge on the face of the formation, the first particulate solid material should have a median particle size which is about 5 times larger than the median size of the particles, e.g., sand, making up the formation. Also, in order to allow some fluid flow therethrough, the first particulate solid material must have a relatively narrow particle size distribution.

The smaller second particulate solid material must have a particle size such that it bridges on the first particulate solid material and forms a seal thereover. Generally, the second particulate solid material must have a median particle size which is about ⅓ the median size of the openings between the first particulate solid material in order to bridge thereon. Further, the second particulate solid material should have a broad particle size distribution in order to form a fluid flow barrier or seal on the first particulate solid material and over the perforations.

The first and second particulate solid materials are preferably selected from the group consisting of acid soluble carbonates, e.g., calcium or iron carbonate, oil soluble organic resins and water soluble alkali and alkaline earth metal salts. As mentioned above, the first and second particulate solid materials can be the same or different, and they can be slurried in the same or different carrier liquids for the purpose of introducing them into the well bore. For a particular particulate solid material, a particular carrier liquid in which the particulate solid material is insoluble must be used. Generally, the carrier liquids are selected from the group consisting of fresh water, unsaturated salt water, sea water, saturated salt water and hydrocarbon liquids. Also, depending upon the particular particulate solid materials utilized, one or more solvents which dissolve the particulate solid materials are utilized. Generally, the solvents are selected from the group consisting of acids, hydrocarbon liquids, fresh water and unsaturated salt water solutions.

When a particulate solid material formed of calcium or iron carbonate is used, the carrier liquid is preferably selected from fresh water, unsaturated salt water, saturated salt water or seawater, and the solvent is preferably selected from aqueous acid solutions which will dissolve the carbonates, preferably an aqueous hydrochloric acid solution.

When the particulate solid material is selected from oil soluble resins, the carrier liquid is preferably selected from fresh water, unsaturated salt water, saturated salt water and seawater, and the solvent is preferably selected from diesel oil, xylene or kerosene. Examples of oil soluble resins which can be utilized are oil soluble modified acrylic resins, oil soluble polystyrene resins, terpenes, phenolics substituted on the ortho or para position, modified alkyd resins, styrenevinyl toluene copolymers, petroleum hydrocarbon derivatives, dimerized rosin acids, pentaery-thritol esters of dimerized rosin acids, and the like.

When the particulate solid material is an alkali or alkaline earth metal salt, the carrier liquid is preferably selected from saturated salt water, seawater or a hydrocarbon liquid, and the solvent is preferably selected from unsaturated salt water.

In the most preferred method of the present invention, the first and second particulate solid materials are formed of the same material, the carrier liquids utilized for introducing the particulate solid materials into the well bore are the same and a single solvent is utilized for dissolving the materials. However, as will be understood by those skilled in the art, any operable combination of particulate solid materials, carrier liquids and solvents can be used, and a variety of soluble particulate solid materials, carrier liquids and solvents other than those specifically mentioned herein can be utilized.

In order to further illustrate the methods of the present invention, the following example is given.

EXAMPLE

Referring to FIG. 5, a perforation and subterranean formation were simulated using a Hassler sleeve, generally designated by the numeral 30. A Berea sandstone core 32 was disposed below a hollow tube 34 contained within the sleeve apparatus 30. The sandstone core 32 simulated the formation and the interior of the hollow tube 24 simulated the perforation. The entrance to the hollow tube was connected to a double ported mandrel 36, and the exit thereof downstream of the sandstone core 32 was connected to a single port mandrel 38. Two fluid reservoirs 40 and 42 were provided, and the tops of the reservoirs 40 and 42 were connected to a source of pressurized nitrogen gas by a conduit system generally designated by the numeral 44. The bottom outlets of the reservoirs 40 and 42 were each connected to an inlet of a three-way valve 46 by conduits 48 and 50, respectively. The outlet of the valve 46 was connected to the inlet of a three-way valve 52 by a conduit 54. A first outlet of the three-way valve 52 was connected to one of the inlets of the mandrel 36 by a conduit 56. The outlet of the mandrel 38 was connected to a valve 58 by a conduit 60 and the other outlet of the valve 52 was connected to the conduit 60 by a conduit 62.

The second port of the mandrel 36 was connected by a conduit 66 to an inlet connection of a three-way valve 64. An outlet connection of the valve 64 was connected to a back pressure regulator 68 by a conduit 70. Outlet connections of the valves 58 and 64 as well as the outlet of the back pressure regulator 68 were connected to a drain system.

The valve 46 was used to select fluid from one of the two reservoirs 40 and 42, and the pressurized nitrogen gas displaced the fluid selected. The valve 52 was utilized to control the direction of flow of the fluid from the selected reservoir, i.e., either in the direction shown by the solid arrows whereby the fluid flowed into the tube 34 and back out of the tube 34 (to simulate circulating a solvent across a perforation opening) or as shown by the dashed arrows through the sandstone core 32 and the hollow tube 34 in the reverse direction. Valves 58 and 64 were used to control the flow through the core or across the perforation opening, and the back pressure regulator 68 allowed pressure to be applied on the core while fluids were washed passed the perforation opening.

The test procedure comprised first determining the permeability of the Berea sandstone core by flowing API brine through the core in the treatment direction, i.e., in the direction from the mandrel 36 to the mandrel 38. The pressure and steady flow rate were monitored and utilized to calculate the permeability of the core using conventional calculations well known to those skilled in the art.

The hollow portion of the tube 34 (the simulated perforation tunnel) was then filled with 80–100 mesh sized sodium chloride salt. A slurry was then prepared from a saturated sodium chloride brine solution thickened with hydroxyethylcellulose polymer in an amount equivalent to 80 pounds per 1000 gallons of the brine containing additional sodium chloride salt sized to less than 140 mesh. The slurry was placed in one of the two fluid reservoirs and nitrogen pressure was used to displace the slurry against the coarse salt in the tube 34 in the treatment direction, i.e., in the direction from the mandrel 36 to the mandrel 38. A pressure of 250 psig was placed on the slurry for 2 hours by way of the valve 46, the valve 52 open to the conduit 56, the valve 64 closed to the conduit 66 and the valve 58 open to the conduit 60. Unsaturated brine was placed in the other of the reservoirs 40 and 42, and the valve 46 was positioned to be opened to the unsaturated brine. Valve 64 was opened to the conduits 66 and 70, and 2 liters of the brine were passed into and out of the hollow tube 34 (simulating flow across the perforation) at 200 psig until leak-off through the core was observed by way of the open valve 58. The pressure was then lowered to 100 psig and the unsaturated brine was flowed through the sandstone core in the treatment direction until a stable rate was obtained. The permeability was then calculated and compared to the original permeability of the sandstone core. 200 milliliters of 15 percent hydrochloric acid was then injected through the core to remove any residual hydroxyethylcellulose polymer and the brine permeability of the core was again determined.

A second test was performed in a similar manner to the test described above except that instead of the two stage method of the present invention, a single stage procedure was followed. That is, the sodium chloride salt sized to less than 140 mesh was placed on the sandstone core face and applied in a single stage.

The results of the above described tests are given in Table I below.

TABLE I

| | Permeability Retention Test Results | |
|---|---|---|
| Sandstone Core Property | Two Stage Method (Present Invention) | Single Stage Method (Prior Art) |
| Initial Brine Permeability, md | 130 | 390 |
| Permeability After Brine Wash, md | 12 | 0[1] |
| Permeability After Acid Wash, md | 160[2] | 0 |

[1]No flow through core during wash step observed.
[2]Some core acid stimulation occurred.

From Table I it can be seen that the two stage method of the present invention resulted in removal of the salt while the single stage prior art method did not.

Thus, the present invention is well adapted to carry out the objects and attain the objects and advantages mentioned as well as those inherent therein. While numerous changes may be made to the invention by those skilled in the art, such changes are encompassed within the spirit of the invention as defined by the appended claims.

What is claimed is:

1. A method of substantially stopping fluid loss into a subterranean formation from a well bore penetrating the formation by way of at least one perforation extending from the well bore into the formation comprising the steps of:
   introducing a first particulate solid material which is soluble in a selected solvent into said well bore and into said formation by way of said perforation, said first particulate solid material having a particle size such that it bridges on the face of said formation and fills said perforation but allows fluid flow therethrough;
   thereafter introducing a second particulate solid material which is soluble in a selected solvent into said well bore, said second particulated solid material having a smaller particle size than said first particulate solid material whereby it bridges on said first solid material and forms a fluid flow barrier over said perforation within said well bore; and
   subsequently removing said first and second particulate solid materials from said well bore, said perforation and the face of said formation by flowing at least one solvent for said particulate solid materials through said well bore into contact with said second particulate solid material therein whereby said barrier over said perforation within said well bore is dissolved and said solvent flows through said perforation into said formation and dissolves said first particulate solid material therein.

2. The method of claim 1 wherein said first and second particulate solid materials are introduced into said well bore, perforation and formation as suspensions in one or more carrier liquids in which said particulate solid materials are not soluble.

3. The method of claim 1 wherein said first particulate solid material as a narrow particle size distribution and a median particle size which is about 5 times larger than the median size of the particles making up said formation.

4. The method of claim 1 wherein said second particulate solid material has a broad particle size distribution and a median particle size which is about ⅓ the median size of the openings between said first particulate solid material when it is bridged on the face of said formation and filling said perforation.

5. The method of claim 1 wherein said first and second particulate solid materials are the same or different and are selected from the group consisting of acid soluble carbonates, oil soluble organic resins and water soluble alkali and alkaline earth metal salts.

6. The method of claim 1 wherein said solvent for said particulate solid materials is selected from the group consisting of acids, hydrocarbon liquids, fresh water and unsaturated salt water solutions.

7. The method of claim 1 wherein said first and second particulate solid materials are the same or different and are selected from calcium and iron carbonates.

8. The method of claim 7 wherein said solvent is an aqueous hydrochloric acid solution.

9. The method of claim 1 wherein said first and second particulate solid materials are the same or different and are selected from the group consisting of oil soluble resins.

10. The method of claim 9 wherein said solvent is selected from the group consisting of diesel oil, xylene and kerosene.

11. The method of claim I wherein said first and second particulate solid materials are the same or different and are selected from the group consisting of water soluble alkali and alkaline earth metal salts.

12. The method of claim wherein said solvent is selected from the group consisting of fresh water and unsaturated salt water solutions.

13. A method of substantially stopping fluid loss into a subterranean formation from a well bore penetrating the formation by way of at least one perforation extending from the well bore into the formation comprising the steps of:

introducing a first particulate solid material which is soluble in a selected solvent into said well bore and into said formation by way of said perforation, said first particulate solid material being selected from the group consisting of acid soluble carbonates, oil soluble organic resins and water soluble alkali and alkaline earth metal salts, and having a particle size such that it bridges on the face of said formation and fills said perforation but allows fluid flow therethrough;

thereafter introducing a second particulate solid material which is soluble in a selected solvent into said well bore, said second particulated solid material being the same material as said first particulated solid material and having a particle size smaller than the size of said first particulate solid material whereby it bridges on said first solid material and forms a fluid flow barrier over said perforation within said well bore; and subsequently removing said first and second particulate solid materials from said well bore, said perforation and the face of said formation by flowing a solvent for said particulate solid materials selected from the group consisting of acids, hydrocarbon liquids, fresh water and unsaturated salt water solutions through said well bore into contact with said second particulate solid material therein whereby said barrier over said perforation within said well bore is dissolved and said solvent flows through said perforation and into said formation and dissolves said first particulate solid material therein.

14. The method of claim 13 wherein said first and second particulate solid materials are introduced into said well bore, perforation and formation as suspensions in one or more carrier liquids in which said particulate solid materials are not soluble.

15. The method of claim 14 wherein said carrier liquids is selected from the group consisting of fresh water, unsaturated salt water, seawater, saturated salt water and hydrocarbon liquids.

16. The method of claim 15 wherein said first particulate solid material has a narrow particle size distribution and a median particle size which is about 5 times larger than the median size of the particles making up said formation.

17. The method of claim 16 wherein said second particulate solid material has a broad particle size distribution and a median particle size which is about ⅓ the median size of the openings between said first particulate solid material when it is bridged on the face of said formation and filling said perforation.

18. The method of claim 17 wherein said first and second particulate solid materials are selected from calcium and iron carbonates and said solvent is an aqueous hydrochloric acid solution.

19. The method of claim 17 wherein said first and second particulate solid materials are the same or different and are selected from the group consisting of oil soluble resins and said solvent is selected from the group consisting of diesel oil, xylene and kerosene.

20. The method of claim 17 wherein said first and second particulate solid materials are selected from the group consisting of water soluble alkali and alkaline earth metal salts and said solvent is selected from the group consisting of fresh water and unsaturated salt water solutions.

* * * * *

UNITED STATES PATENT AND TRADEMARK OFFICE
CERTIFICATE OF CORRECTION

PATENT NO. : 5,191,931
DATED : March 9, 1993
INVENTOR(S) : Ronald E. Himes and Walter R. Dill It is certified that error appears in the above-identified patent and that said Letters Patent is hereby corrected as shown below:

In column 5, line 28, delete (2) and insert therefore --26--

In column 9, line 39, delete (claim I) and insert therefore --claim 1--

In column 9, line 44, delete (claim) and insert therefore --claim 11--

Signed and Sealed this

Eleventh Day of January, 1994

Attest:

BRUCE LEHMAN

*Attesting Officer*    *Commissioner of Patents and Trademarks*